March 31, 1970     R. BACHOWSKI     3,504,062
METHOD OF PRODUCING ALUMINUM PARTICLES
Filed Feb. 21, 1968
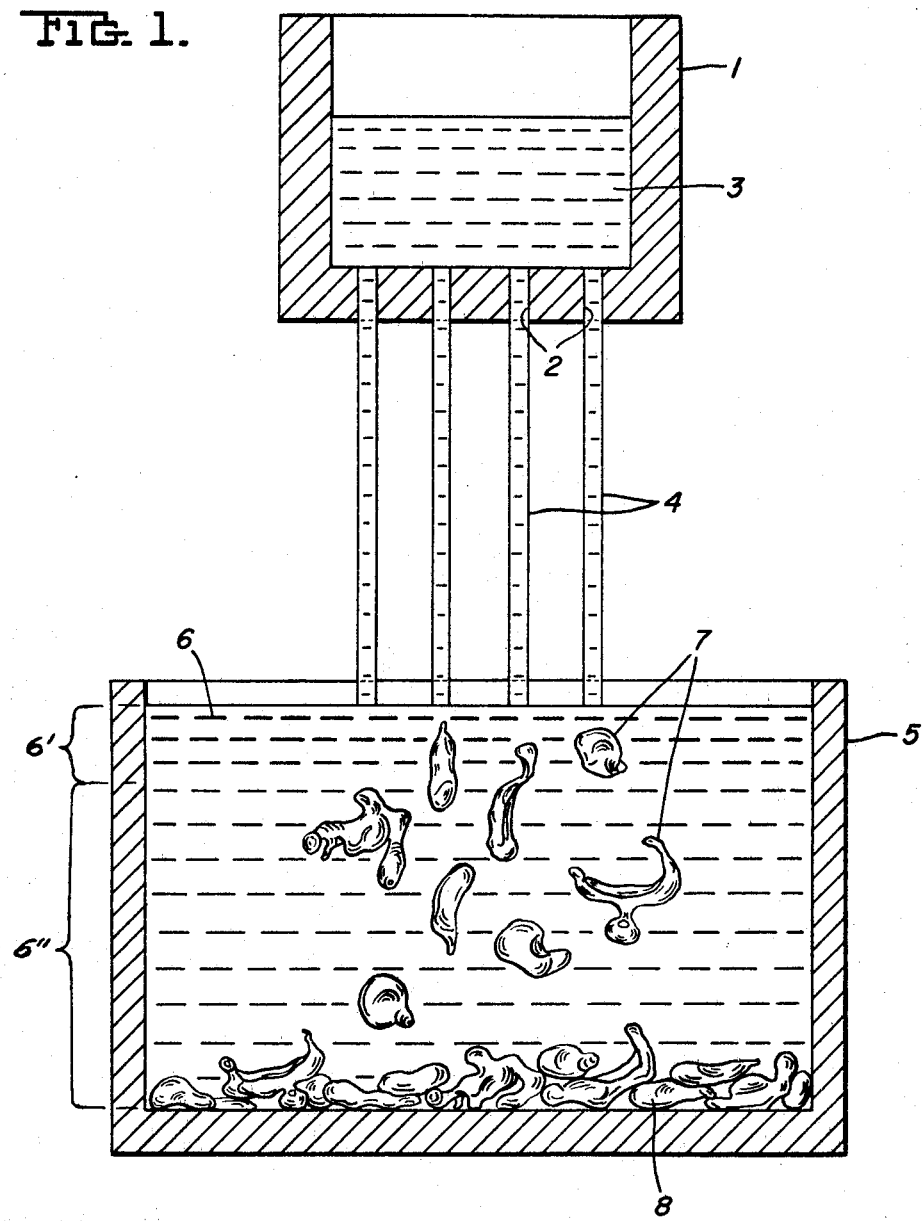
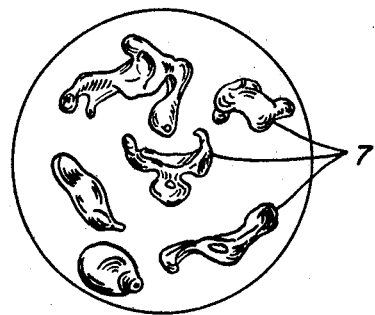
INVENTOR.
RONALD BACHOWSKI

United States Patent Office 3,504,062
Patented Mar. 31, 1970

3,504,062
METHOD OF PRODUCING ALUMINUM PARTICLES
Ronald Bachowski, Monroeville, Pa., assignor to Aluminum Company of America, Pittsburgh, Pa., a corporation of Pennsylvania
Filed Feb. 21, 1968, Ser. No. 707,094
Int. Cl. B22d 23/08
U.S. Cl. 264—13                    2 Claims

ABSTRACT OF THE DISCLOSURE

A mass of solid individual irregular-shaped aluminum particles each particle having a length of between 0.3 and 2.2 inches, a length to minimum width ratio of 4:1 to 30:1, and a length to maximum width ratio of 1.1:1 to 4:1 which mass tends to pack loosely together in any space occupied by a mass of the particles. Producing a mass of these aluminum particles by conducting a 4/32 to 9/32 of an inch, in diameter, stream of molten aluminum at a velocity of 7.5 to 30 feet/second into a liquid quenching medium; initially solidifying the conducted stream in a first heat extraction zone into discrete partially solidified irregular-shaped particles having a solid shell surrounding a core or molten metal; and further effecting solidification of the partially solidified particles in a second heat extraction zone to produce the desired particles.

---

This invention pertains to irregular-shaped elongated solid aluminum particles and to a method of producing such aluminum particles. As generally used herein, the term "aluminum" includes pure aluminum, a commercial grade of aluminum and alloys consisting of at least 80 percent by weight of aluminum.

Solid aluminum particles, for example particles in the form of granulated ingot, have been used in the manufacture of various catalysts in the organic chemical industry. However, the particles produced by known methods have not been altogether satisfactory in some cases when used in the manufacture of catalysts prepared by reacting aluminum particles in towers with various organic liquids. This is caused by either the improper size or shape of these particles. For example, conventional granulated ingot and aluminum shot particles when employed in reaction towers, tend to pack so tightly that fluid flow is greatly restricted and chemical reaction cannot proceed rapidly. Round fibers of aluminum up to 2 inches long produced by extruding molten aluminum through orifices about 0.010 inch in diameter and solidifying the streams as they emerge are so thin that when a mass of them are accumulated, they pack together like a plastic packing and are likewise unsuitable for use in reaction towers. It should be pointed out that while the particular particles produced by the invention are suitable for use in reaction towers, there are many other commercial uses to which the particles may be put.

Accordingly, it is an object of this invention to provide a new and improved method of producing aluminum particles.

It is a further object of the invention to provide a new and improved method for producing solid, elongated, irregular-shaped aluminum particles suitable for forming a mass of low bulk density.

A still further object of the invention is to provide a mass of independent irregular-shaped aluminum particles which tend to pack loosely together and leave a multitude of voids within a given space occupied by a mass of the particles.

Other objects and advantages of the invention will become apparent to those skilled in the art from the following detailed description of the invention and the drawings referred to therein of which:

FIG. 1 is a sectional elevational view of an apparatus suitable for producing the solid elongated irregular-shaped aluminum particles.

FIG. 2 further illustrates the solid elongated irregular-shaped aluminum particles produced by the new and improved method provided by the invention.

The invention provides a method of producing solid irregular-shaped aluminum particles by conducting a continuous unbroken stream of molten aluminum having a diameter of 4/32 to 9/32 of an inch at a velocity of from about 7.5 to about 30.0 feet per second into a liquid quenching medium, initiating solidification of the conducted stream in a first heat extraction zone of the liquid quenching medium having a depth of less than six inches by maintaining the first heat extracting zone in a heat transfer relation with the conducted stream to initially solidify the conducted stream into discrete partially solidified irregular-shaped aluminum particles having a solid shell surrounding a core of molten metal, and extracting additional heat from the partially solidified aluminum particles to further effect solidification in a second heat extracting zone of the liquid quenching medium by maintaining the second heat extracting zone in a heat transfer relation with the partially solidified particles to produce solid discrete irregular-shaped aluminum particles having a length of between 0.3 and 2.2 inches, a length to minium width ratio of between 4 to 1 and 30 to 1, and a length to maximum width ratio of between 1.1 to 1 and 4 to 1. In the preferred method of practicing the invention, the liquid quenching medium is water and the extraction of additional heat from the partially solidified aluminum particles in the second heat extracting zone of the water quenching medium effects complete solidification of the non-solid aluminum particles.

Referring to the drawings, one suitable apparatus for producing the solid irregular-shaped aluminum particles is shown. Molten metal 3 is maintained in receptacle 1 at a temperature above 1300° F. The molten metal head in this receptacle is preferably maintained between 4 and 6 inches. The addition of molten metal to the receptacle 1 is not shown as it forms no part of the invention, such addition being made by a variety of known methods. The molten metal flows through and issues from round orifices 2. Any number of these orifices may be employed, but each orifice has a diameter between 4/32 and 9/32 of an inch at the point of issuance of the molten metal. In practicing the invention, four to ten orifices have advantageously been used to obtain in excess of 600 pounds of the solidified particles in one hour. The four orifices shown in the drawing have been drilled in the bottom of the receptacle 1. However, a metal plate having a multiple number of orifices can also be employed as the bottom of the receptacle. Also, contoured refractory inserts of suitable material, with holes of suitable size therethrough, may be used by placing such inserts either into holes drilled in the bottom of the receptacle or into the orifices of a metal plate. When such inserts are used, the contour of the insert is not material so long as the diameter of the hole through each insert at the point of issuance of the molten metal is between 4/32 and 9/32 of an inch.

The separate streams 4 of molten metal are continuous and unbroken from the point of issuance to the surface of the quenching medium, i.e. the molten metal stream is not issued intermittently and does not separate into individual particles or lengths prior to being conducted into the liquid quenching medium. A velocity of from about 7.5 to about 30 feet per second is imparted to each issued continuous stream. With the apparatus shown, this velocity is imparted by allowing each stream to fall a distance of about 9 to 12 inches in air or other gaseous medium before each stream enters the quenching liquid. Horizontal apparatus can also be employed, with mechanical means being used to impart the desired velocity to the continuous streams of molten metal.

In order for the desired particles to be obtained, the molten metal must enter the quenching medium as a moving continuous stream. The quenching medium 6 is maintained in quenching tank 5. In order to produce the desired particles, the solidification of the conducted molten aluminum stream is carried out in several heat extracting zones, within the quenching medium; otherwise the particles would be flat or porous or be of improper size or shape. In the first heat extracting zone 6', the conducted stream of molten aluminum is maintained in that specific heat transfer relation with the liquid of the first heat extracting zone which effects initial solidification of the entering stream into discrete, partially solidified irregular-shaped aluminum particles having a solid shell surrounding a core of molten metal. When water is employed in the first heat extraction zone of the liquid quenching medium, this initial solidification is accomplished by maintaining the first heat extraction zone at a depth of less than six inches and at a temperature of between 125° and 150° F. Other non-inflammable, non-explosive liquids, such as brine or glycerin or combinations thereof, could also be employed in the first heat extraction zone in place of water. In employing such other liquids, the depth of the first heat extracting zone is similarly maintained at less than six inches but at a temperature which results in that specific heat transfer relation required to achieve the initial solidification of the conducted stream of molten aluminum.

Additional heat is then extracted from the non-solid aluminum particles to further effect solidification in a second heat extracting zone 6'' of the liquid quenching medium. Solidification is accomplished by maintaining the liquid of the second heat extraction zone in a heat transfer relation with the partially solidified particles formed in the first heat extraction zone to produce the solid discrete irregular-shaped particles of the invention. Conveniently, the liquid of the second heat extracting zone is the same as the liquid used in the first heat extracting zone. When water is employed as the liquid of both heat extraction zones, then further rinsing or washing of the particles after their formation is avoided. The depth of the second heat extraction zone will depend to some degree on the temperature maintained in the second heat extraction zone. For example, a second heat extraction zone depth of at least 45 inches is required if the temperature of the second zone is between 125° and 150° F. Alternatively, the second heat extraction zone could be maintained at a substantially cooler temperature by the use of cooling coils or the like and the depth of the second heat extraction zone could then be reduced. After passing through both heat extraction zones, a mass 8 of the particles is accumulated on the bottom of quenching tank 5. The means for removing the mass of particles is not shown as it forms no part of the invention. The particles may be removed by any known means such as by pumping the particles out over a dewatering stream.

The invention also concerns a mass of aluminum particles comprising a conglomeration of independent solid irregular-shaped aluminum particles which are characterized by having a length of between 0.3 and 2.2 inches; a length to minimum width ratio between 4/1 and 30/1; and a length to maximum width ratio of between 1.1 to 1 and 4 to 1; which particles tend by reason of their irregular shapes to pack loosely together, leaving a multitude of voids within a given space occupied by a mass of the particles. It should be understood that by the term "width" I mean the value obtained by measuring along the normals to the particle's major axis when a particle is rotated through 360 degrees. It is apparent that for every particle there is a determinable minimum width and a determinable maximum width. In reference to FIG. 1, the particles 7 are shown descending downwardly through the quenching liquid and conglomerating into a mass 8 of individual particles. The particles because of their irregular shapes are not able to pack tightly together and a large number of vacant areas or voids exist between the particles.

The following example and tables are illustrative of the invention.

Grade A aluminum having a minimum aluminum content of 99.90 percent aluminum and incidental impurities generally present in commercial grade aluminum was melted and fed into a receptacle which had four round orifices, each orifice having a diameter of 5/32 of an inch at the point of issuance, drilled in the bottom of the receptacle. The molten aluminum was maintained at a temperature of 1350° F. in the issuing receptacle. After the molten aluminum head was 4 inches, the molten metal flowed through the orifices, and additional molten aluminum was continuously added to the receptacle to maintain the 4-inch head. The molten aluminum issued from each orifice in a continuous stream; the rate of issuance of molten metal from each orifice was about 150 pounds per hour. The four separate continuous streams of molten metal were allowed to fall a distance of 9 inches in air into a quenching medium of water, so that a velocity of 7.6 feet per second was imparted to each stream. The water was maintained at a temperature of 135°±5° F. in both heat extraction zones. The initial solidification of the stream into discrete particles having a solid shell surrounding a core of molten metal was complete in the first five inches of water, which represented the first heat extraction zone. The further solidification in the second heat extracting zone was complete after the initially solidified particles traveled downwardly through a depth of about 50 inches of water.

The mass of particles produced was manually removed from the quenching tank and batch dried. The particles had generally the irregular shape and contour of the particles 7, shown in the drawings.

Table I shows data for twelve representative particles. Column A sets forth the length to minimum width ratio and Column B sets forth the length to maximum width ratio. The measurements were all made in centimeters and in addition, the length of the longest and shortest particles is set forth in inches.

TABLE I

| Particle Number | Length in cm. | Minimum width in cm. | Maximum width in cm. | A | B | Particle number | Length in inches |
|---|---|---|---|---|---|---|---|
| 1 | 5.4 | 0.2 | 1.6 | 27/1 | 3.38/1 | 1 | 2.13 |
| 2 | 4.0 | 0.2 | 1.2 | 20/1 | 2.22/1 | 12 | 0.4 |
| 3 | 3.3 | 0.2 | 0.9 | 16.5/1 | 3.67/1 | | |
| 4 | 2.2 | 0.4 | 0.9 | 5.5/1 | 2.44/1 | | |
| 5 | 2.0 | 0.4 | 1.2 | 5.0/1 | 1.67/1 | | |
| 6 | 1.9 | 0.1 | 0.7 | 19/1 | 2.71/1 | | |
| 7 | 1.9 | 0.1 | 0.7 | 19/1 | 2.71/1 | | |
| 8 | 1.5 | 0.2 | 1.3 | 7.5/1 | 1.15/1 | | |
| 9 | 1.5 | 0.2 | 1.0 | 7.5/1 | 3.0/1 | | |
| 10 | 1.35 | 0.15 | 0.6 | 9/1 | 2.25/1 | | |
| 11 | 1.2 | 0.1 | 0.6 | 12/1 | 2.0/1 | | |
| 12 | 1.0 | 0.1 | 0.5 | 10/1 | 2.0/1 | | |

Although I have described the particles of my invention and a specific example of producing these particles, various modifications may be made in the present invention without departing from the spirit or scope thereof and it is understood that I limit myself only as defined in the appended claims.

What is claimed is:
1. A method of producing solid irregular-shaped aluminum particles comprising:
   (a) conducting a continuous unbroken stream of molten aluminum having a diameter of 4/32 to 9/32 of an inch at a velocity of about 7.5 to about 30.0 feet per second into a liquid quenching medium;
   (b) initiating solidification of said conducted stream in a first heat extracting zone of said liquid quenching medium having a depth of less than six inches, by maintaining said first heat extracting zone in a heat transfer relation with said conducted stream whereby said conducted stream is initially solidified into discrete partially solidified irregular-shaped aluminum particles having a solid shell surrounding a core of molten metal; and
   (c) extracting additional heat from said partially solidified aluminum particles to further effect solidification in a second heat extracting zone of said liquid quenching medium by maintaining said second heat extracting zone in a heat transfer relation with said partially solidified particles whereby solid discrete irregular-shaped aluminum particles having a length of between 0.3 and 2.2 inches, a length to minimum width ratio of between 4 to 1 and 30 to 1, and a length to maximum width ratio of between 1.1 to 1 and 4 to 1 are produced.

2. A method of producing solid irregular-shaped aluminum particles in accordance with claim 1 wherein the liquid quenching medium is water and wherein the extraction of additional heat from said partially solidified aluminum particles in said second heat extracting zone of said water quenching medium effects complete solidification of said partially solidified aluminum particles.

References Cited

UNITED STATES PATENTS

| | | | |
|---|---|---|---|
| 1,671,683 | 5/1928 | Podseus | 75—0.5 |
| 1,780,201 | 11/1930 | Martin | 264—13 |
| 2,040,168 | 5/1936 | De Bats | 75—0.5 |
| 2,076,798 | 4/1937 | Teeple | 264—13 |
| 2,211,775 | 8/1940 | Haunz | 264—8 |
| 3,241,948 | 3/1966 | Claiborne et al. | 75—0.5 |

L. DEWAYNE RUTLEDGE, Primary Examiner

W. W. STALLARD, Assistant Examiner

U.S. Cl. X.R.

75—0.5